United States Patent [19]
LeMaitre

[11] Patent Number: 5,715,970
[45] Date of Patent: Feb. 10, 1998

[54] COMPACT DISK STORAGE CASE APPARATUS

[76] Inventor: Jeff L. LeMaitre, 27 Lambert Way, Novato, Calif. 94945

[21] Appl. No.: 599,417

[22] Filed: Jan. 12, 1996

[51] Int. Cl.⁶ .................................................. A47K 10/24
[52] U.S. Cl. ................................................ 221/45; 206/312
[58] Field of Search ........................ 221/33, 45; 206/309, 206/311, 312, 313

[56] References Cited

U.S. PATENT DOCUMENTS

| | | | |
|---|---|---|---|
| 4,473,153 | 9/1984 | Colangelo | 206/312 |
| 4,899,875 | 2/1990 | Herr | 206/313 |
| 4,971,195 | 11/1990 | Mitsuyama | 206/311 |
| 5,048,681 | 9/1991 | Henkel | 206/312 |
| 5,263,581 | 11/1993 | Rosen | 206/313 |

*Primary Examiner*—Kenneth Noland
*Attorney, Agent, or Firm*—Larry D. Johnson

[57] ABSTRACT

A storage and dispensing apparatus for use with compact disks (CDs) and the like includes a housing portion having a plurality of closed edges and an open top edge, with a front surface, and terminating in a bottom flange portion bearing a feature for insertion into a magazine. Slidably carried within the housing portion is a CD tray portion, which can be fully inserted within the housing portion for storage or transport, with only a tab portion extending at least some distance above the housing portion open top edge. The CD tray portion includes an upper return to engage the edge of a CD to prevent its inadvertent removal, and a lower return carried on the bottom edge of the tray, which engages an inwardly-disposed catch member carried on the front surface of the housing to prevent the tray from being completely removed from the housing.

2 Claims, 8 Drawing Sheets

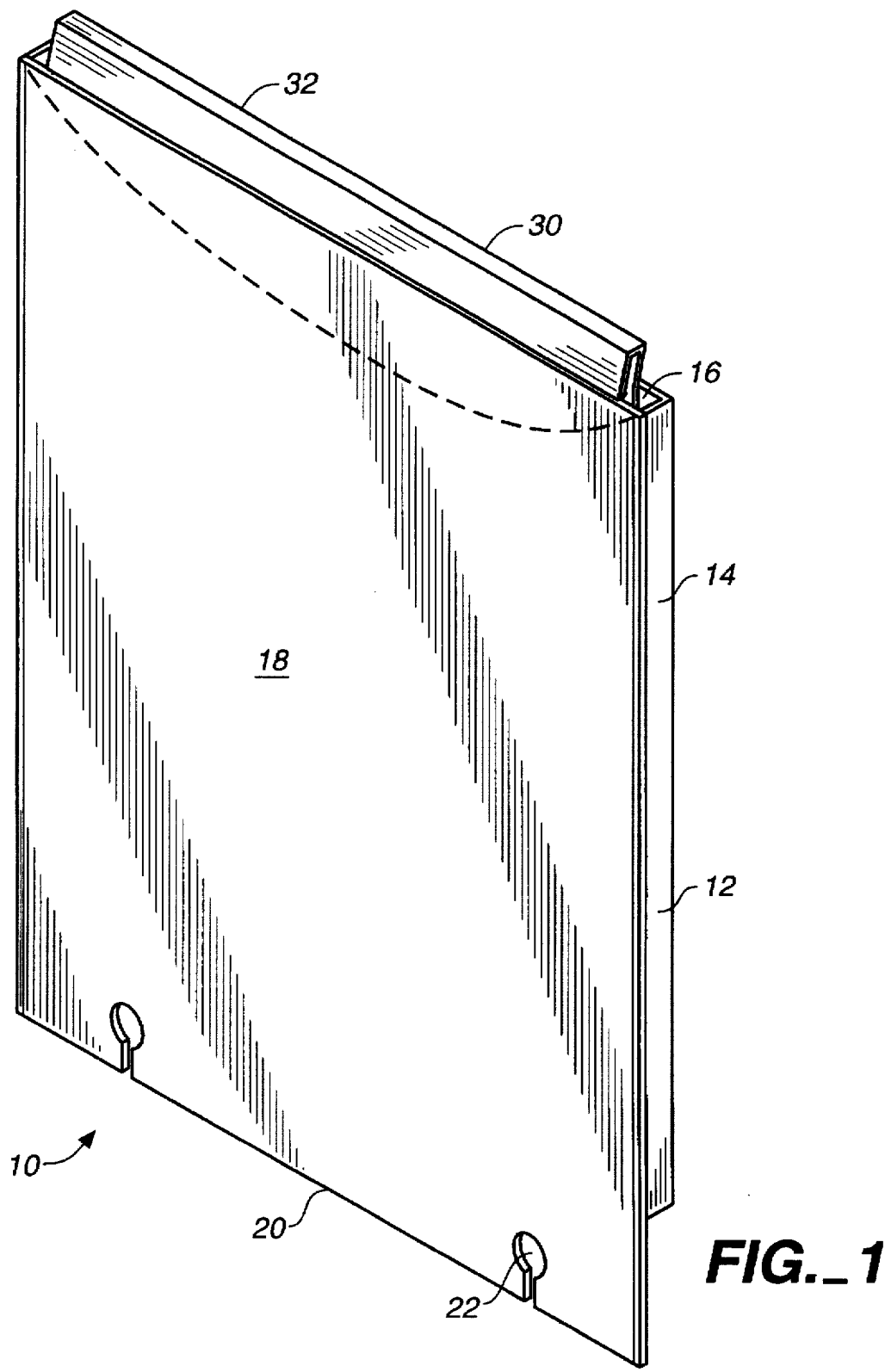
FIG._1

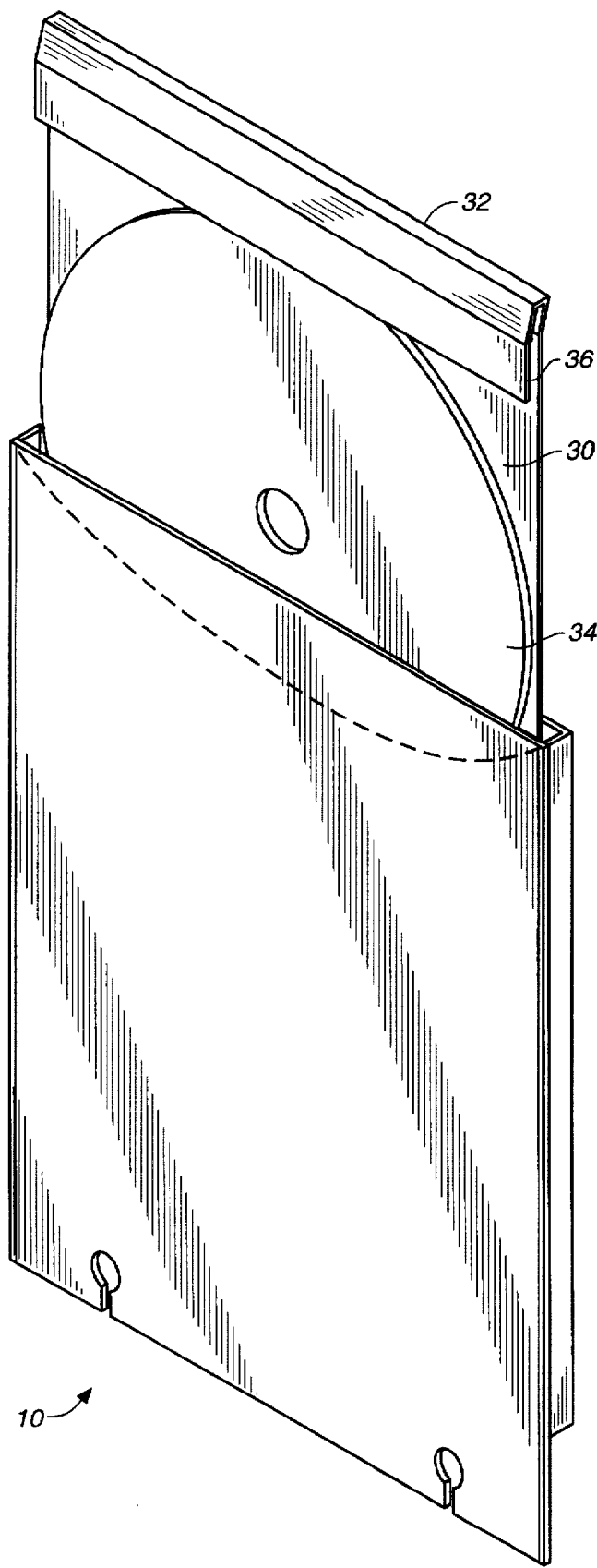
FIG._2

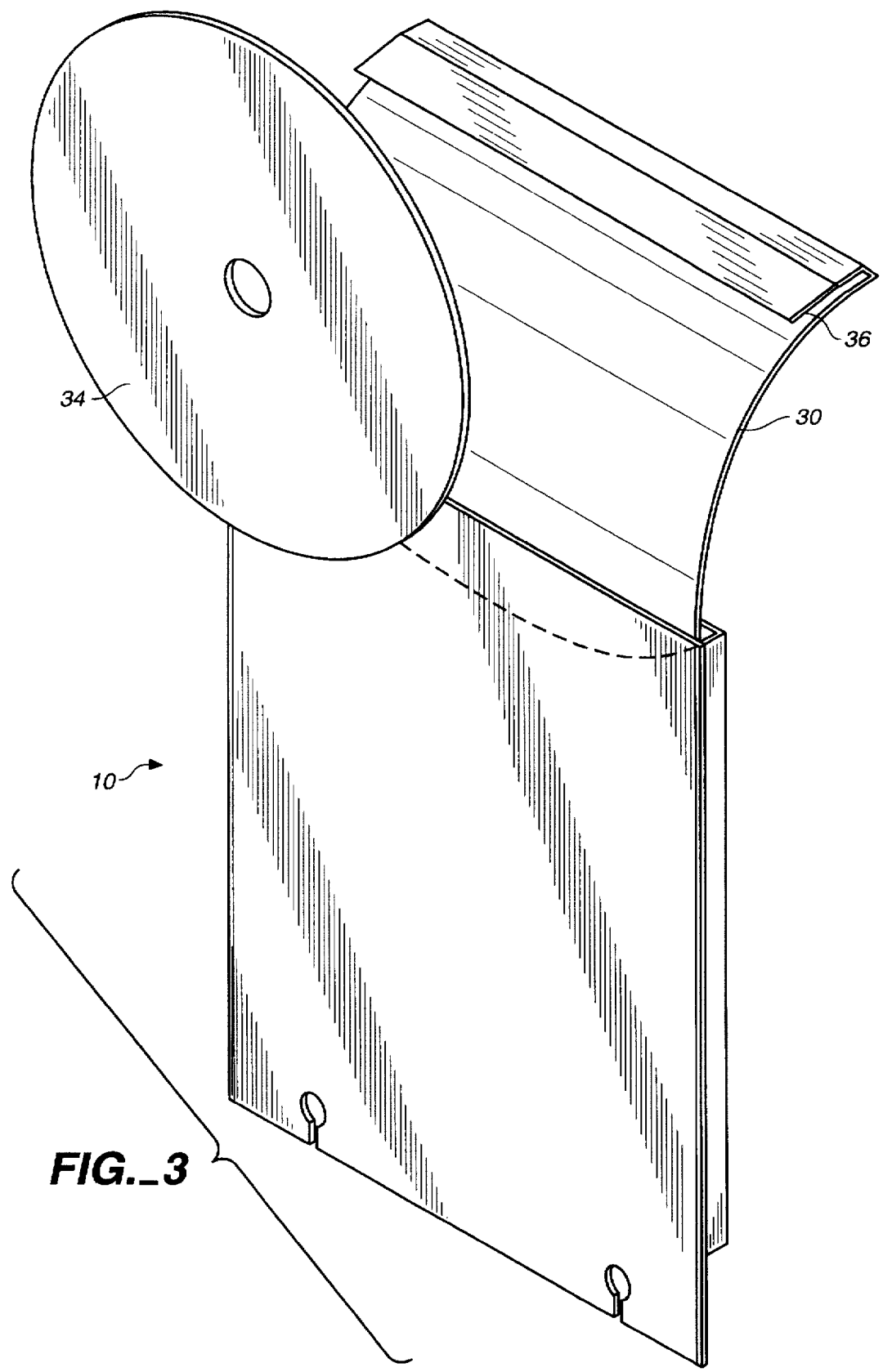
FIG._3

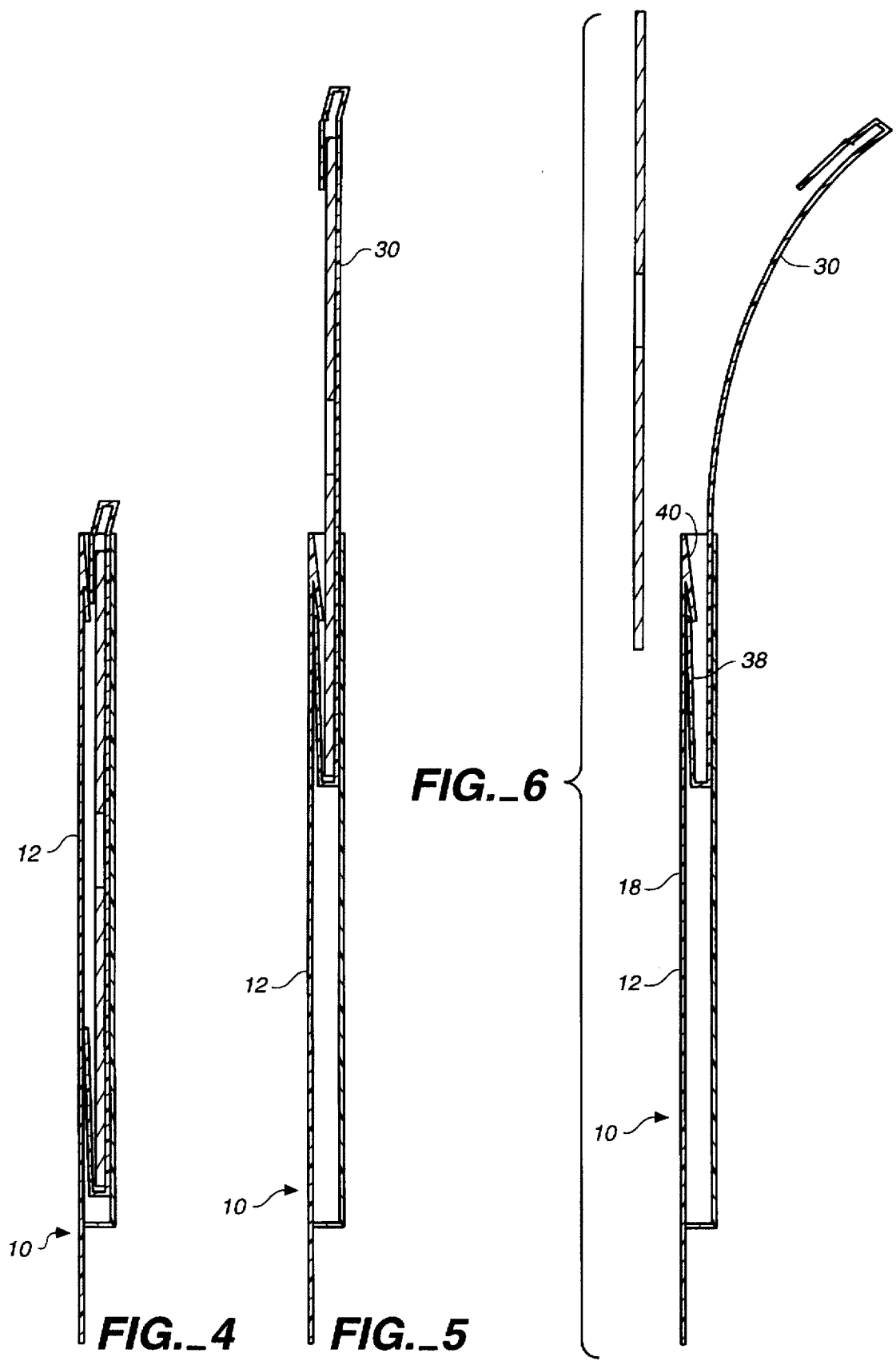

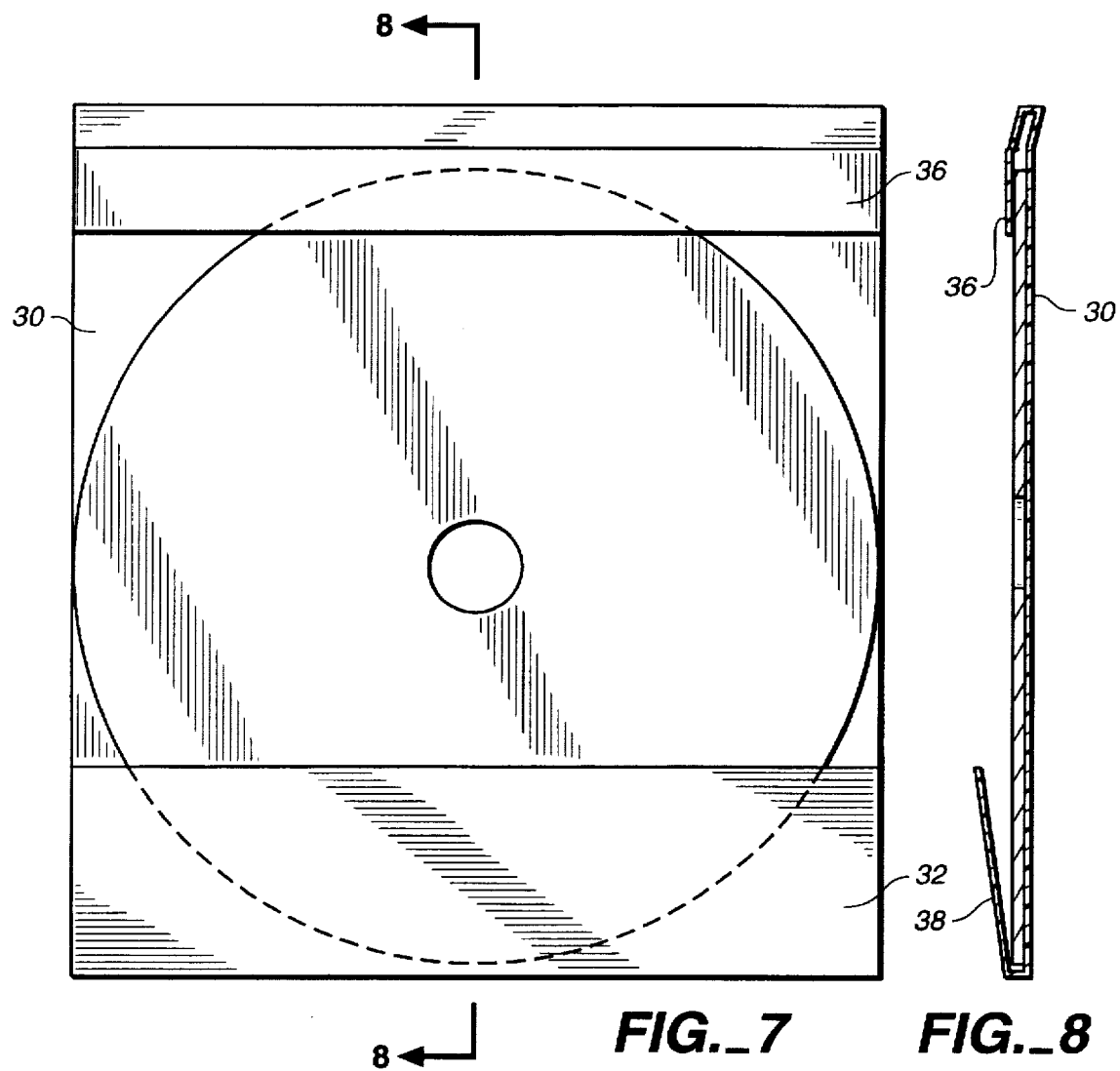
FIG._7  FIG._8

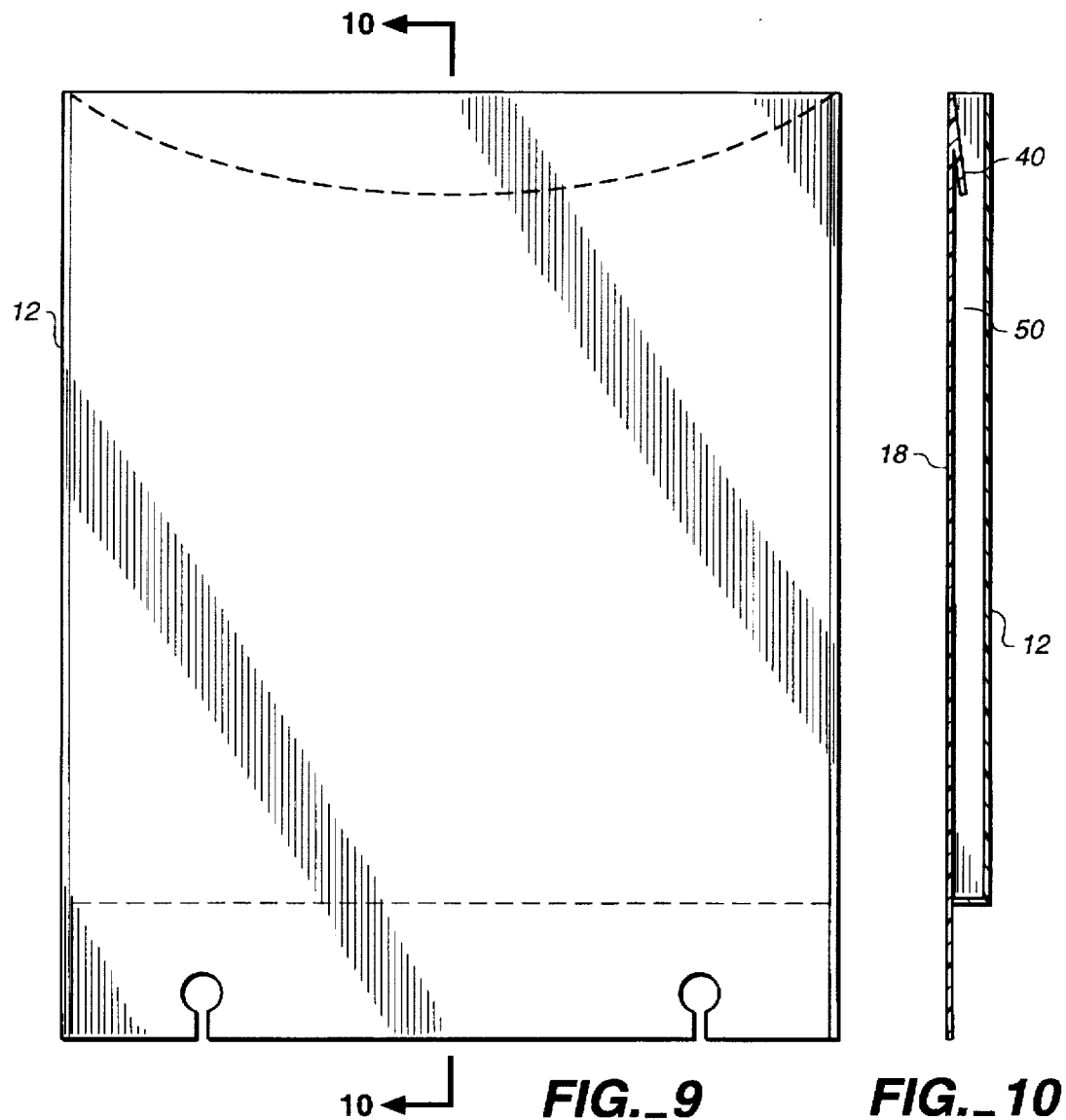
FIG._9  FIG._10

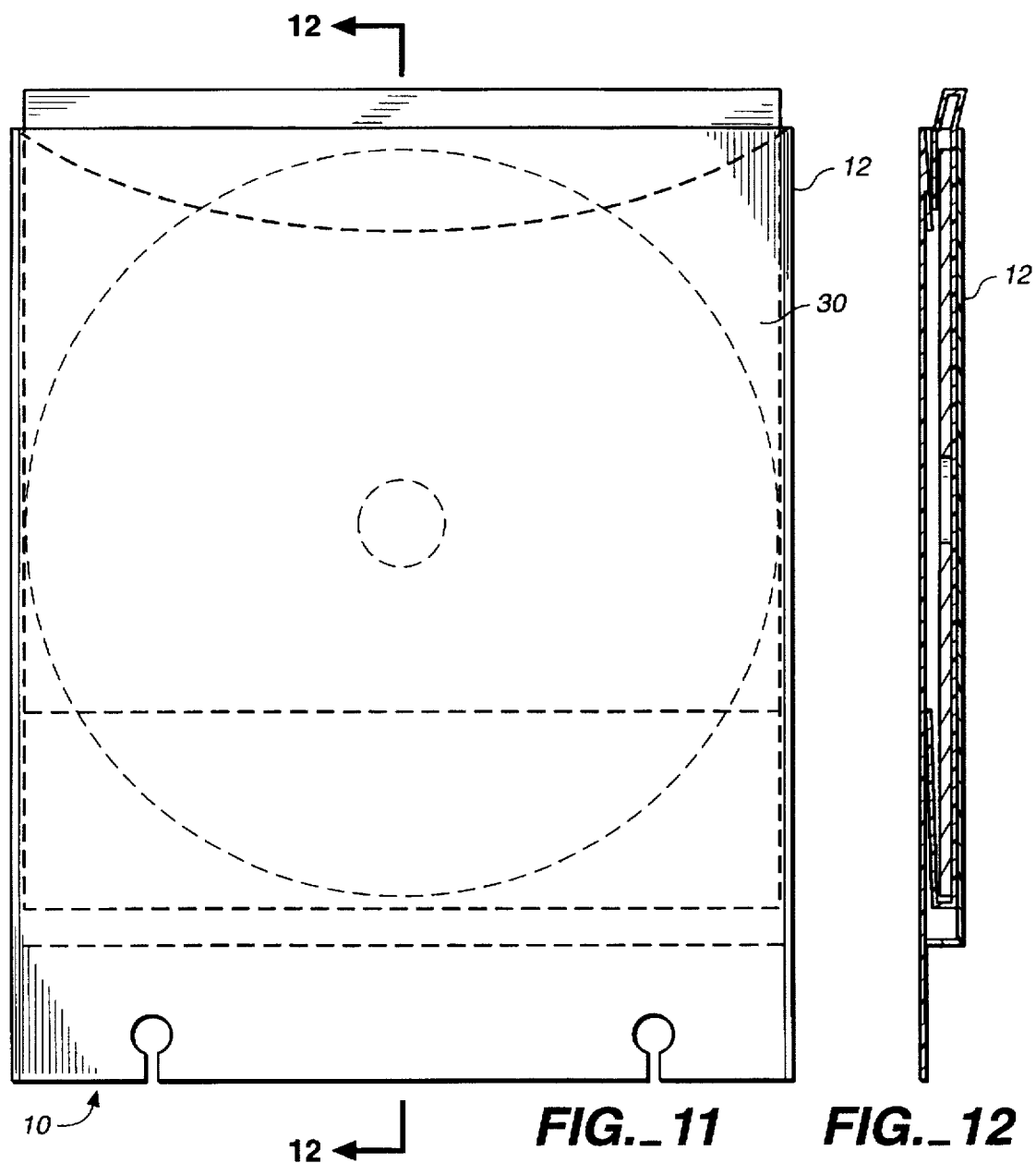
FIG._11  FIG._12

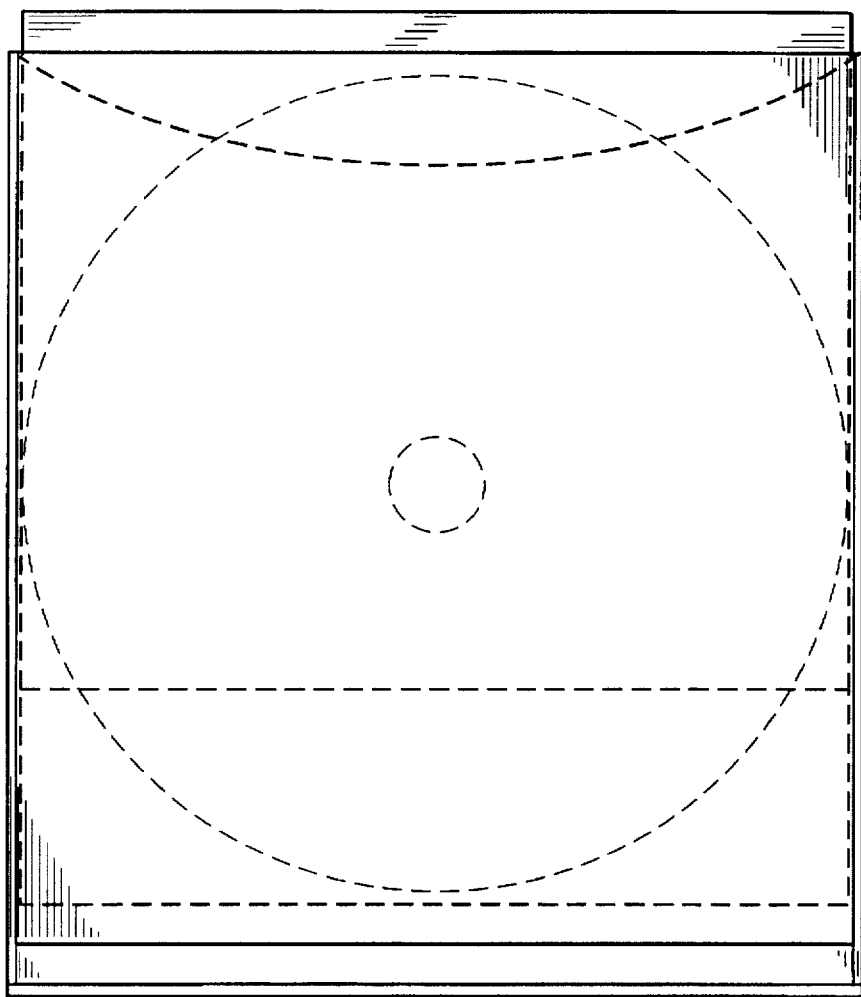 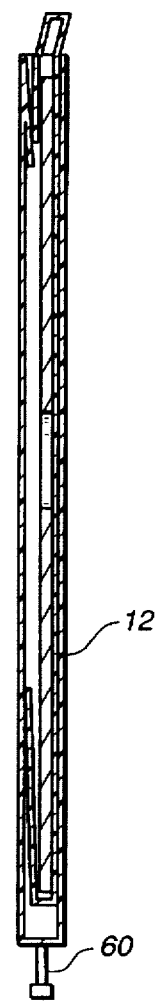
FIG._13    FIG._14

COMPACT DISK STORAGE CASE APPARATUS

BACKGROUND OF THE INVENTION

1. Field of the Invention

This invention relates generally to audio and video equipment and accessories, and more specifically to an improved storage and dispensing apparatus for use with compact disks (CDs) and the like.

2. Description of the Prior Art

Compact disks, both audio and video, are well known and in widespread use. Typically, these disks are distributed and sold in hard plastic cases referred to as "jewel boxes", which are hinged on one edge thereof to enable insertion and removal of the CD when desired. However, these prior art CD cases suffer from numerous disadvantages, including but not limited to their bulkiness, fragility, relative difficulty in the opening and closing of the cases for access to the CD, and the difficulty in efficiently storing a plurality of the cases in a magazine or other carrier.

SUMMARY OF THE INVENTION

The compact disk storage case apparatus of this invention provides an improved storage and dispensing apparatus for use with compact disks (CDs) and the like. The inventive apparatus includes a housing portion defining a box or envelope having a plurality of closed edges and an open top edge, with a front surface, and terminating in a bottom flange portion bearing a fastening feature such as a keyway for insertion into a magazine. Slidably carried within the housing portion is a CD tray portion, which can be fully inserted within the housing portion for storage or transport, with only a tab portion extending at least some distance above the housing portion open top edge. This tab portion enables easy grasping of the CD tray portion by the user, and also provides a flat surface for a label or other written indicia (e.g., CD title information).

The CD tray portion includes an upper (CD capture) return to engage the edge of a CD to prevent its inadvertent removal when the tray is extended. The flexible tray can be flexed backwards, and/or the upper return flexed outward, to facilitate removal and insertion of the CD from the tray. This upper return also provides a further flat surface suitable as a label area, e.g., for a song list or other information about the CD carried within. The tray portion further includes a lower (tray capture) return portion carried on the bottom edge of the tray, which engages the edge of the CD so that the CD is carried with the tray as it slides into or out of the housing. As the tray is extended from the housing, this lower (tray capture) return portion engages an inwardly-disposed catch or tab member carried on the front surface of the housing. Engagement of the lower return with the housing catch member prevents the tray from being completely removed from the housing, while still allowing the CD to be removed from the tray as described above.

The upper and lower returns of the CD tray portion not only hold the CD itself in place, but also cooperate to hold and releasbly retain associated materials such as a cover booklet, song card, catalog, and the like, which items are frequently packaged with a CD.

BRIEF DESCRIPTION OF THE DRAWINGS

FIGS. 1-3 are a series of perspective views of a compact disk storage case apparatus of this invention, illustrating the case apparatus in operation to store and protect a compact disk (CD) when not in use, and to dispense a CD for use or receive a CD for storage when desired;

FIG. 1 illustrating the case apparatus in its closed (storage) configuration;

FIG. 2 illustrating the case apparatus in its partially extended configuration; and FIG. 3 illustrating the case apparatus in its fully extended configuration enabling dispensing of or insertion of a CD;

FIGS. 4-6 are a series of perspective views of the compact disks storage case apparatus of this invention again illustrating the case apparatus in three configurations;

FIG. 4 illustrating the case apparatus in its closed (storage) configuration;

FIG. 5 illustrating the case apparatus in its partially extended configuration; and FIG. 6 illustrating the case apparatus in its fully extended configuration;

FIG. 7 is a front elevation view of the flexible tray portion of the compact disk storage apparatus of this invention;

FIG. 8 is a side elevation cross-sectional view of the flexible tray portion of FIG. 7, this view taken along line 8—8 of FIG. 7;

FIG. 9 is a front elevation view of the housing portion of the compact disk storage apparatus of this invention;

FIG. 10 is a side elevation cross-sectional view of the housing portion of FIG. 9, this view taken along line 10—10 of FIG. 9;

FIG. 11 is a front elevation view of the compact disk storage case apparatus of this invention, illustrating the tray portion (in phantom) fully inserted into the housing portion for CD storage;

FIG. 12 is a side elevation cross-sectional view of the compact disk storage case of FIG. 11, this view taken along line 12—12 of FIG. 11 (this view is analogous to FIG. 4, and shown here for relation to FIG. 11);

FIG. 13 is a front elevation view of a preferred embodiment of the compact disk storage case of this invention, illustrating a keyway-type bottom flange of the housing portion for insertion into a magazine; and FIG. 14 is a side elevation cross-sectional view of the preferred embodiment of the compact disk storage case of FIG. 13, this view taken along line 14—14 of FIG. 13.

DETAILED DESCRIPTION OF A PREFERRED EMBODIMENT

FIGS. 1-3 are a series of perspective views of a compact disk storage case apparatus 10 of this invention, illustrating the case apparatus in operation to store and protect a compact disk (CD) when not in use, and to dispense a CD for use or receive a CD for storage when desired. FIG. 1 illustrates the case apparatus 10 in its closed (storage) configuration, and shows the housing portion 12 defining a box or envelope having a plurality of closed edges 14 and an open top edge 16, with a front surface 18, and terminating in a bottom flange portion 20 bearing a fastener feature such as a binder aperture 22 for insertion into a magazine. Slidably carried within housing portion 12 is CD tray portion 30, shown fully inserted within the housing portion for storage or transport, with only a tab portion 32 extending at least some distance above the housing portion open top edge.

FIG. 2 illustrates the case apparatus 10 in its partially extended (open) configuration. Here, CD tray portion 30 has been partially removed from the housing portion to reveal compact disk 34. Upper (CD capture) return 36 engages the edge of CD 34 to prevent its inadvertent removal.

FIG. 3 illustrates the case apparatus 10 in its fully extended (open) configuration enabling dispensing of or insertion of CD 34. Flexible tray 30 can be flexed backwards, and/or upper return 36 flexed outward, to facilitate removal and insertion of the CD from the tray.

FIGS. 4-6 are a series of perspective views of the compact disks storage case apparatus 10 of this invention, again illustrating the case apparatus in three configurations; FIG. 4 illustrating the case apparatus in its closed (storage) configuration; FIG. 5 illustrating the case apparatus in its partially extended configuration; and FIG. 6 illustrating the case apparatus in its fully extended configuration. These views illustrate the remaining components of the inventive apparatus, including lower (tray capture) return portion 38 carried on the bottom edge of tray 30, which engages inwardly-disposed catch or tab member 40 carried on the front surface 18 of housing 12. Engagement of lower return 38 with catch member 40 prevents tray 30 from being completely removed from housing 12, while allowing the CD to be removed from the tray as described supra.

FIG. 7 is a front elevation view of the flexible tray portion 30 of the compact disk storage apparatus of this invention; while FIG. 8 is a side elevation cross-sectional view taken along line 8—8 of FIG. 7. FIG. 8 illustrates both upper return 36 and lower return 38 as being contiguous, folded portions of the tray 30 itself. Alternatively, either or both of these returns could be separately constructed and affixed to the tray.

FIG. 9 is a front elevation view of the housing portion of the compact disk storage apparatus of this invention; while FIG. 10 is a side elevation cross-sectional view taken along line 10—10 of FIG. 9. FIG. 10 best illustrates the open cavity 50 defined by the housing 12, with inwardly-disposed catch or tab member 40 carried on the front surface 18.

FIG. 11 is a front elevation view of the compact disk storage case apparatus 10 of this invention, illustrating the tray portion 30 (in phantom) fully inserted into the housing portion 12 for CD storage. FIG. 12 is a side elevation cross-sectional view taken along line 12—12 of FIG. 11 (this view is analogous to FIG. 4, and shown here for relation to FIG. 11).

FIG. 13 is a front elevation view of a preferred embodiment of the compact disk storage case of this invention, illustrating a fastening feature in the form of a keyway-type bottom flange 60 of the housing portion 12 for insertion into a magazine, while FIG. 14 is a side elevation cross-sectional view taken along line 14—14 of FIG. 13. This keyway-type bottom flange 60 may be preferable for ease in manufacture, and for certain storage applications.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and their legal equivalents.

What is claimed as invention is:

1. A storage and dispensing apparatus for a compact disk, said apparatus comprising:
    a housing portion defining a box having a plurality of closed edges and an open top edge, with a front surface, said front surface including an inwardly-disposed catch member; and
    a CD tray portion slidably carried within said housing portion, said tray portion bearing a tab portion extending at least some distance above the housing portion open top edge, an upper return portion adapted to engage the edge of a CD to prevent its inadvertent removal, and a lower return portion adapted to engage an inwardly-disposed catch member carried on the front surface of the housing.

2. The storage and dispensing apparatus for a compact disk of claim 1 wherein said housing portion includes a bottom flange portion bearing a fastening feature for insertion into a magazine.

* * * * *